United States Patent [19]

Strebel

[11] Patent Number: 5,533,044

[45] Date of Patent: Jul. 2, 1996

[54] METHOD OF ELECTRODE REGULATION OF A DC ARC FURNACE AND ELECTRODE REGULATION DEVICE

[75] Inventor: Eduard Strebel, Nussbauman, Switzerland

[73] Assignee: ABB Management AG, Baden, Switzerland

[21] Appl. No.: 365,958

[22] Filed: Dec. 29, 1994

[30] Foreign Application Priority Data

Dec. 29, 1993 [DE] Germany .......................... 43 44 854.2

[51] Int. Cl.$^6$ ................................................ H05B 7/148
[52] U.S. Cl. .......................... 373/104; 373/105; 373/108
[58] Field of Search ...................... 373/102, 104, 373/105, 106, 108; 219/137 R, 137 PS

[56] References Cited

U.S. PATENT DOCUMENTS

| | | | |
|---|---|---|---|
| 4,435,631 | 3/1984 | Drovet et al. | 373/105 |
| 4,607,373 | 8/1986 | Bergman | 373/104 |
| 4,677,643 | 6/1987 | Dicks | 373/105 |
| 5,155,740 | 10/1992 | Ao et al. | 373/108 |
| 5,351,267 | 9/1994 | Strebel | 373/105 |

FOREIGN PATENT DOCUMENTS

| | | |
|---|---|---|
| 0023058 | 7/1980 | European Pat. Off. . |
| 0068180 | 6/1982 | European Pat. Off. . |
| 137140 | 8/1982 | Germany . |
| 237047 | 6/1986 | Germany . |

*Primary Examiner*—Tu Hoang
*Attorney, Agent, or Firm*—Burns, Doane, Swecker & Mathis

[57] ABSTRACT

DC arc furnaces have a current regulator for maintaining the current of an arc constant and an electrode regulator for affecting the position of an electrode of the arc furnace and thus the length of the arc. Adjustment of the position of the electrode takes place by a hydraulic electrode adjustment device, which is controlled as a function of the difference between a predeterminable electrode regulator command variable signal and a voltage actual signal. The arc length is adjusted in such a way that a rectifier operates on the average with a deflection of, for example, 35° el., independently of the secondary voltage of a furnace transformer and a set current set value. To be able to better protect the wall of the arc furnace and to better utilize the fed-in energy during operation with foaming slag, the arc length is automatically adapted to a slag height. The electrode regulator set value signal is calculated by a computer as a function of an arc field strength and a loudness signal which was detected by a loudness detector.

13 Claims, 2 Drawing Sheets

5,533,044

METHOD OF ELECTRODE REGULATION OF A DC ARC FURNACE AND ELECTRODE REGULATION DEVICE

BACKGROUND OF THE INVENTION

1. Field of the Invention

The invention relates to a method of electrode regulation of a DC arc furnace, whose arc current strength is controlled to a predeterminable set current value by means of a control signal or a rectifier correcting variable signal and whose electrode distance, i.e. the distance between at least one controllable electrode and a molten bath of the arc furnace, is controlled as a function of a difference between a predeterminable electrode regulator set value signal and an electrode regulator actual signal. The invention further relates to an electrode regulation device for a DC arc furnace for executing the method.

2. Background of the Invention

The state of the art is known from European Patent Publication EP-0 068 180 B1. There, an arc furnace with DC current supply is controlled by means of two control circuits. A current regulator assures a constant current in accordance with a preselected set current value. An electrode regulator circuit affects the position of the electrode and thus the arc length. If the arc is increased, the current regulator must increase the voltage or trigger the rectifier in such a way that the current remains constant. However, this is only possible as long as there is a voltage reserve. The control of the electrode takes place by means of an adaptable DC voltage regulator. The arc voltage is used as the actual DC voltage value and is provided via a damping element to a comparator or an adder. It is necessary to calculate the set DC voltage value respectively for each working point, taking into consideration the transformer voltage step and the electrode current. It is initially limited as a function of the transformer step of the rectifier transformer, and thus the possible voltage increase of the rectifier, by means of a limiter in such a way that the rectifier is stationary operated maximally closely below the rectifier limit position. The set value is smoothed and supplied to the adder so that no overshooting of the actual value occurs with fluctuations in the voltage set value, which could cause the breaking of the arc. When the arc furnace is operated in connection with foaming slag, the efficiency of the arc furnace can be reduced because of the heat radiation when the arc leaves the slag.

OBJECT AND SUMMARY OF THE INVENTION

It is an object of the invention to develop a method for the control of the electrodes of a DC arc furnace as well as an electrode regulator device of the type mentioned at the outset in such a way that the arc length is automatically adapted to the slag height during an operation involving foaming slag.

An advantage of the invention lies in that the wall of the arc furnace is better protected and the fed-in energy is better utilized.

The invention will be explained below with the aid of exemplary embodiments, making reference to the attached drawings.

BRIEF DESCRIPTION OF THE DRAWINGS

The present invention can be further understood with reference to the following description and the appended drawings, wherein like elements are provided with the same reference numerals. In the drawings.

DETAILED DESCRIPTION OF THE PREFERRED EMBODIMENTS

Figure 1:
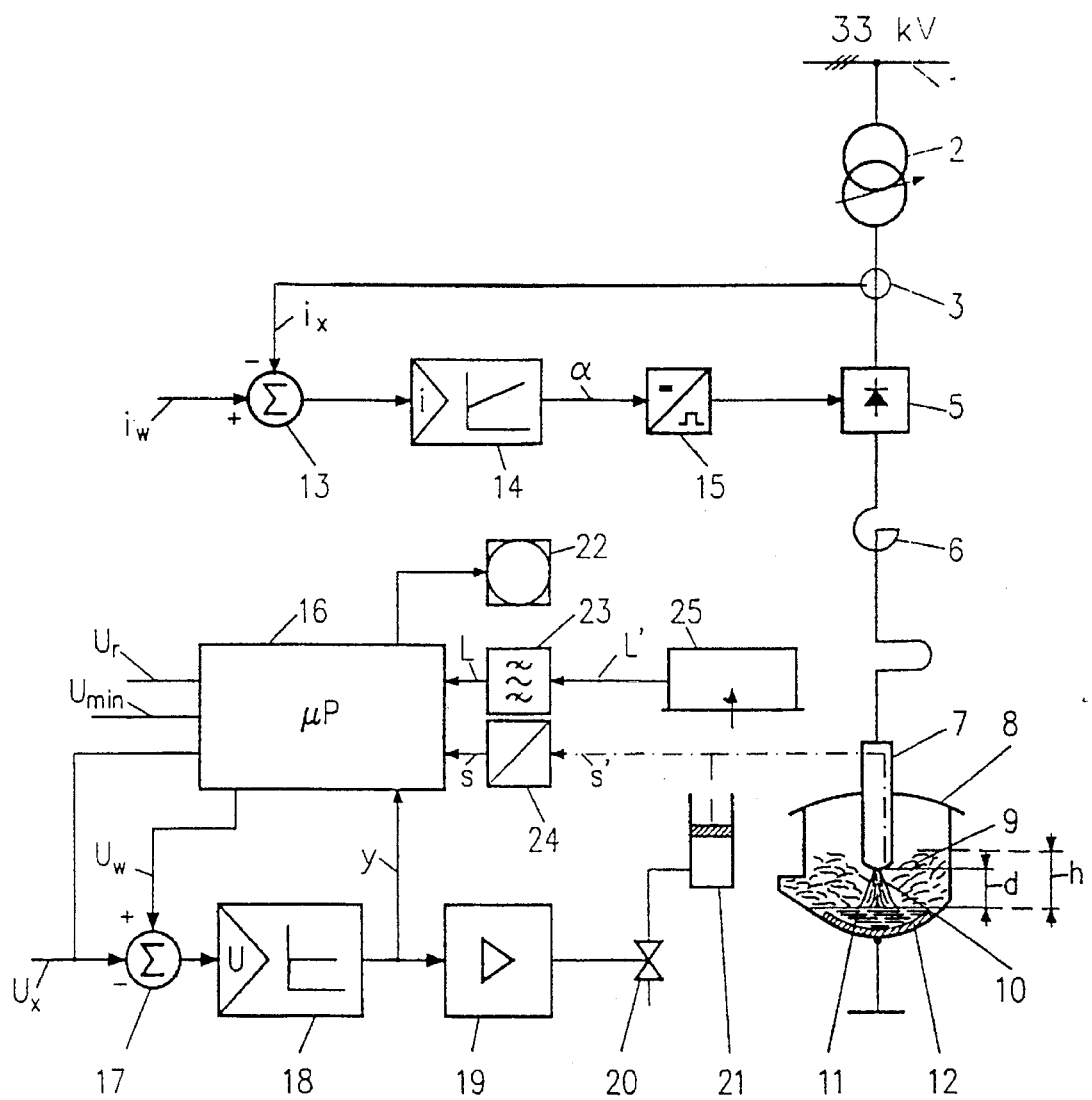
FIG. 1 is a basic circuit diagram of a DC arc furnace with a current regulation circuit and an electrode regulator circuit.

Referring now to the drawings, wherein like reference numerals designate identical or corresponding parts through the several views, in FIG. 1 shows a furnace transformer (2) with several switch steps, one end of which is connected to an AC current net (1) of an AC voltage of 33 kV and the other end of which with the AC voltage input of a power converter or rectifier (5). The DC side of the rectifier (5) is connected via a reactance coil (6) with a first electrode or cathode (7) of an arc furnace (8). A second electrode or anode (12) disposed in the bottom area of the arc furnace (8) is connected with the positive pole of the rectifier (5) (not shown). An arc (10) burns between the lower end of the cathode (7) and slag, identified by (9), as well as the surface of a molten mass or a molten bath (11). An arc length or electrode distance, i.e. the distance between the cathode (7) and the molten bath (11), is indicated by (d), and (h) identifies the slag height or slag level above the molten mass (11).

A current or actual current value signal ($i_x$) is detected by means of a current transformer (3) in the AC supply line to the rectifier (5) and is supplied to an inverting input of a comparator or adder (13). A predeterminable current set value signal ($i_w$) is provided to a non-negating input of this adder (13), for example by a potentiometer, not shown.

The output side of the adder (13) is connected with a current regulator (14) with a proportional-integral characteristic, which on the output side provides a rectifier correcting variable signal ($\alpha$), corresponding to a firing angle, to a firing pulse converter (15), whose output side controls the rectifier (5).

An actual voltage signal ($U_x$), which is proportional to the DC voltage of the cathode (7), is supplied to an inverting input of an adder (17) as the electrode regulator actual value signal. A set voltage signal ($U_w$) is supplied by a computer (16) to a noninverting input of this adder (17) as the electrode regulator command variable signal. The output side of the adder (17) is connected with an electrode regulator (18) with a proportional characteristic, whose output side acts via a valve amplifier (19) on a valve (20) of an electrode adjustment device (21), which comprises a regulating cylinder and a regulating column, not shown, with an electrode support arm. The electrode adjustment device (21) is mechanically connected with the cathode (7) and makes possible its height adjustment; it acts as a first order delay element.

A lift/lower position (s') is detected by the electrode adjustment device (21) and is supplied via an analog/digital converter (24) to the computer (16) as a digitized lift/lower position (s). A microphone or a loudness detector (25) provides an unfiltered loudness signal (L'), which is proportional to the loudness of the arc furnace (8), to a bandpass filter (23); at the output side it supplies the computer (16) with a filtered and digitized loudness signal (L). In addition, the actual voltage signal ($U_x$), a DC minimum value ($U_{min}$) of the electrode DC voltage and a predeterminable DC reference value ($U_r$) are supplied to the computer (16). On the output side the computer (16) is connected with a display device or reporting device (22) to indicate that the slag level (h) in the arc furnace must be increased.

The electrode regulation operates about ten times as slow as the current control. The height adjustment of the cathode (7) is performed such that the rectifier (5) operates on the average with a deflection of, for example, 35° el., independently of the secondary voltage of the furnace transformer (2) and the set current set value ($i_w$). For the sake of simplicity the values and signals assigned to them are indicated in the same way.

It is possible to provide the adder (17) with a cos-α signal, multiplied by the secondary voltage of the furnace transformer (2), as the electrode regulator actual value signal, in place of an actual voltage signal ($U_x$). It is also possible to use an arc output signal for this, following a previous division by the actual current value ($i_x$).

Figure 2:
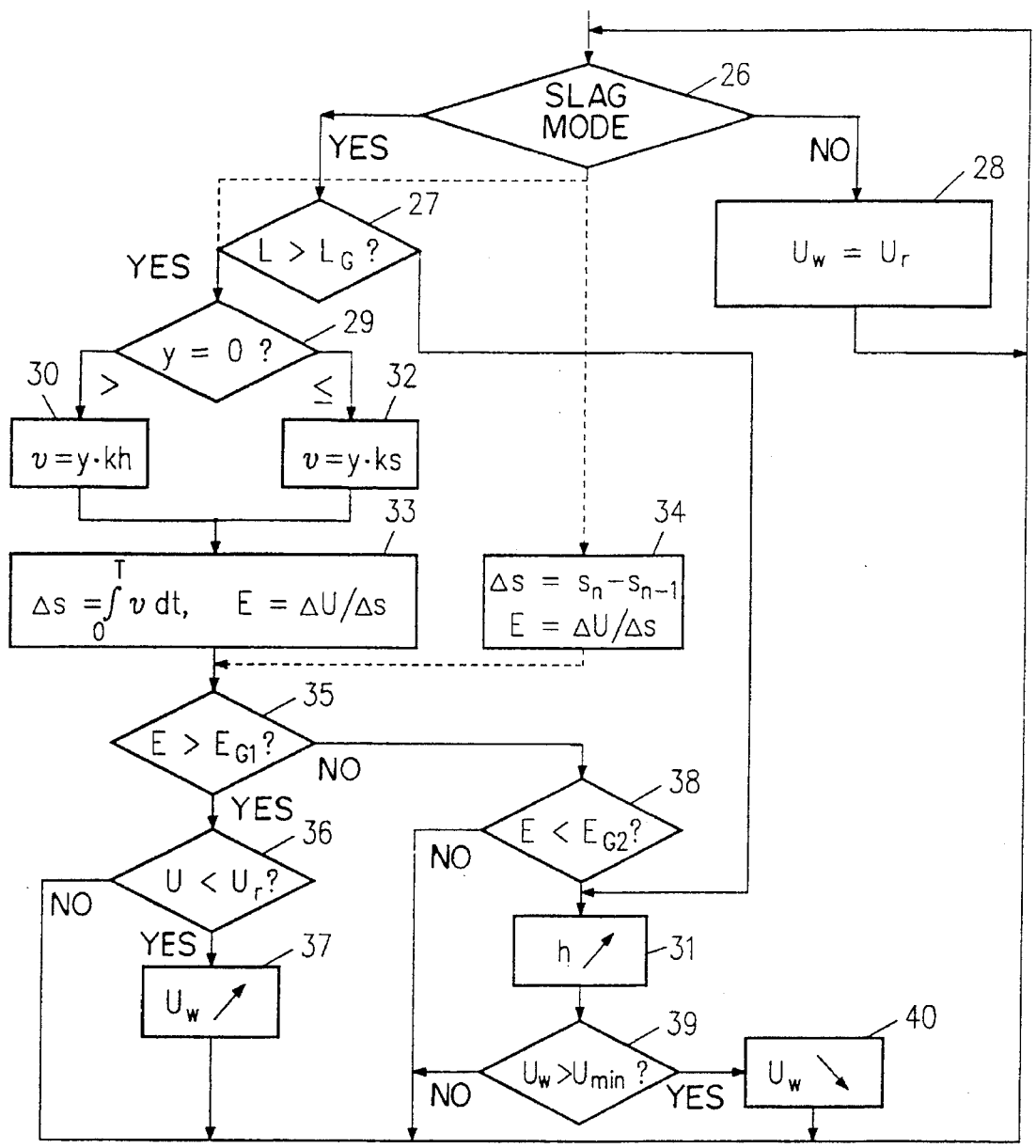
FIG. 2 is a flow diagram for the determination of an electrode regulator set value signal for the electrode regulator circuit of FIG. 1.

In a flow diagram, FIG. 2 shows the essential portions of the evaluation of the signals supplied to the computer (16). An interrogation is performed at a branch (26) to determine whether or not the arc furnace (8) operates in the slag mode. If not, the electrode regulator set value signal ($U_w$) is set to the value of the DC voltage reference value ($U_r$) in an operational block (28) and a return to the input of the branch (26) is performed. Otherwise an interrogation is performed at a branch (27) whether or not the loudness signal (L) is greater than a predeterminable loudness limit value ($L_G$). If not, a jump to an operational block (31) is made, otherwise to a branch (29). The electrode regulator correcting variable (y) is compared with zero. With y>0, a lift/lower speed (v) of the cathode (7) or the electrode adjustment device (21)=y · ks is set in an operational block (30). For y≦0, v=y·ks is set in an operational block (32). kh and ks are constants or predeterminable correction values for lifting or lowering, which take into account that with the same value of y the lifting and lowering speeds of the cathode (7) can be different. A path change (Δs) of the cathode (7) is calculated in an operational block (33) by means of these v values by integration over a predeterminable length of time or period of integration(T), and from this an arc field strength (E) in accordance with E=ΔU/s. In this case ΔU means the change of the electrode actual voltage ($U_x$) during the integration period (T) in accordance with $\Delta U = U_{xn} - U_{xn-1}$, wherein $U_{xn}$ identifies the voltage value at the end of the integration length (T) and $U_{xn-1}$ the voltage value at the start thereof.

The path change (Δs) can be derived, instead of from the electrode regulator correcting variable (y), see the operational block (34) in dashed lines, connected between the branches (27) and (35), from the lift/lower position (s) from the output of the analog/digital converter (24), see FIG. 1, in accordance with $\Delta s = s_n - s_{n-1}$, wherein $s_n$ indicates the position value at the end of the integration length (T) and $s_{n-1}$ at the start.

Following the calculation of the arc field strength (E), an interrogation is performed in a branch (35) to determine whether or not this arc field strength (E) is greater than a predeterminable first field strength limit value ($E_{g1}$) of preferably 16 V/cm. If not, a jump to a branch (38) is made, otherwise an interrogation is performed in a branch (36) whether or not the electrode regulator set value ($U_w$) is less than the DC voltage reference value ($U_x$). If not, a jump to the input of the branch (26) is made. Otherwise the electrode regulator set value ($U_w$) is increased in an operational block (37) and a jump to the input of the branch (26) is also made.

An interrogation is performed in the branch (38) whether or not this arc field strength (E) is less than a predeterminable second field strength limit value ($E_{G2}$) of preferably 8 V/cm. If not, a jump is made to the input of the branch (26), otherwise a report "raise slag level" is issued in an operational block (31) via the reporting device (22), see FIG. 1, and an interrogation is made in a branch (39) whether or not the electrode regulator set value ($U_w$) is greater than the DC voltage minimal value ($U_{min}$). If not, a jump is made to the input of the branch (26), otherwise the electrode regulator set value ($U_w$) is reduced in an operational block (40) and a jump is also made to the input of the branch (26).

The report "increase slag level" can be directly used for controlling the slag height. In the process, this increase signal controls an integrator, not shown, in such away that the integrator is run up if the slag level is too low and provides a slag height control, also not shown, with a greater set value. The time constant of this integrator is adapted to the time behavior of the slag foam (9). The computer (16) sees to it that the electrode regulator (18) readjusts the electrode (7) as a function of the slag height until the desired arc length has been reached. The increase signal now vanishes and the integrator slowly runs down. In this way the slag height is always maintained at the optimal height, which corresponds to an optimal energy input.

Figure 3:
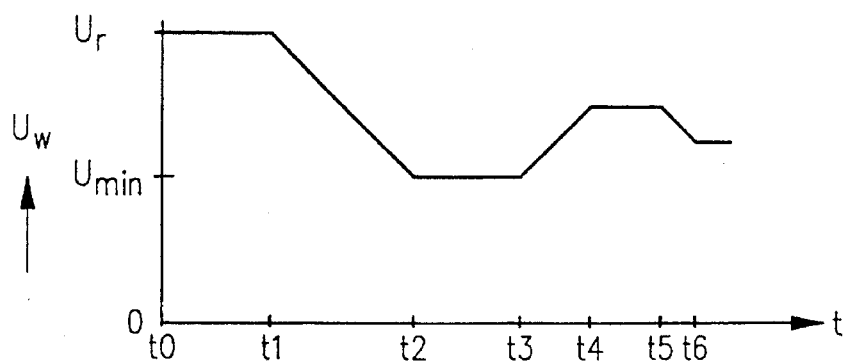
FIG. 3 is a time-function diagram of the electrode regulator set value voltage.

FIG. 3 shows by way of example the change of the electrode regulator set value ($U_w$) as a function of time (t). At a time (t0), the electrode regulator set value ($U_w$) is equal to the DC voltage reference value ($U_w$). The loudness signal (L) is greater than the loudness limit value ($L_G$) between the times (t1) and (t3). At the same time, the electrode regulator set value signal ($U_x$) is greater than the DC voltage minimum value ($U_{min}$) between the times (t1) and (t2), so that the electrode regulator set value ($U_w$) decreases during this time interval. Since the DC voltage minimum value ($U_{min}$) is attained at the time (t2), the electrode regulator set value ($U_w$) remains unchanged from that time until the time (t3). The arc field strength (E) is greater than the first field strength limit value ($E_{G1}$) between the times (t3) and (t4), and at the same time the electrode regulator set value ($U_w$) is less than the DC voltage reference value ($U_r$), so that the electrode regulator set value ($U_w$) increases and thereafter remains constant until a time (t5). The arc field strength (E) is less than the second field strength limit value ($E_G$) between the times (t5) and (t6), and at the same time the electrode regulator set value ($U_w$) is greater than the DC voltage minimal value ($U_{min}$), so that the electrode regulator set value ($U_w$) is reduced again during this time interval.

Figure 4:
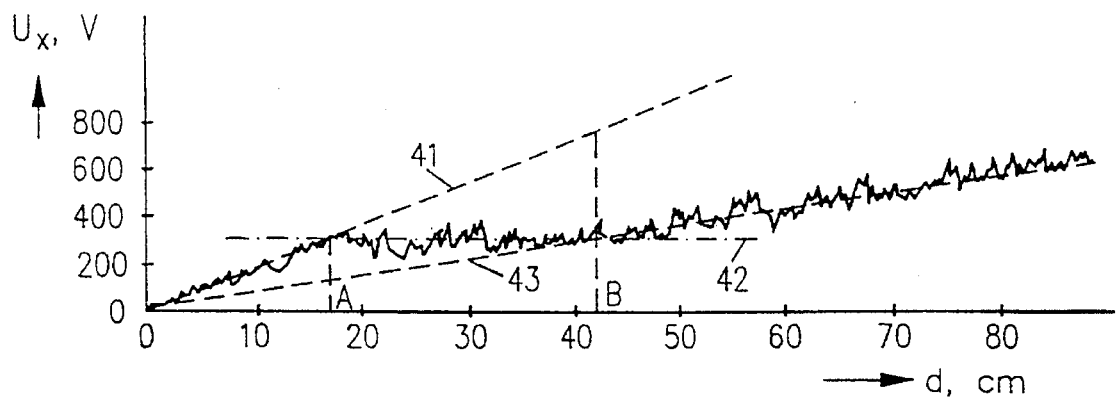
FIG. 4 is a diagram of the arc field strength as a function of an arc length in the arc furnace.

FIG. 4 shows the course of the electrode voltage ($U_x$) in Volts as a function of the electrode distance (d) in cm, wherein the current ($i_x$) was maintained at a value of 60 kA. It can be seen from the diagram that the arc field strength (E), indicated by straight lines (41 to 43), is not constant. With a short arc (10) up to approximately 17 cm, corresponding to an operational point (A), the arc field strength (E) is approximately 18 V/cm, see the straight line (41), and then remains approximately constant over an adjustment path of 25 cm, i.e. until an operational point (B), see the straight line (42). With further adjustment it can be seen that the arc field strength (E) only is approximately 7 V/cm, see the straight line (43).

An analysis shows that an arc (10) covered by slag (9) has a higher resistance value than a free-burning one. This corresponds to a greater arc field strength (E).

A slag foam of approximately 17 cm in height was used in the course of the measurement represented in FIG. 4. This corresponds to the height (h) which is attained at the operational point (A). It can be assumed that, starting with this operational point (A) from which the arc (10) begins to burn free, the radiation effect of the current ($i_x$) increasingly displaces the slag (9). The arc field strength (E) decreases with an increasing electrode distance (d). At a height of 42 cm at the operational point (B), the arc (10) attains the state it would have had without slag (9). The arc (10) has an output of 18 MW (300 V·60 kA) at the operational point (A). But it has the same output at the operational point (B) with 2.5 times the arc length. In this state more than 50% of the arc (10) burns above the slag (9). Because of this the efficiency of the arc furnace (8) is considerably decreased through heat radiation.

It is an aim of the invention to detect the arc field strength (E) and in this way to adapt the arc length (d) during operation with foaming slag (9) automatically to the slag height (h) in order to better protect the wall of the arc furnace (8) and to better utilize the fed-in energy. The electrode regulator set value signal ($U_w$) is provided to the electrode regulator (18) by the computer (16). The actual voltage signal ($U_x$) corresponds to the output voltage of the rectifier (5). The cathode (7) is adjusted by means of a lift/lower speed (v) proportional to the electrode regulator correcting variable (y) via the valve amplifier (19) and the electrode adjustment device (21) until the arc voltage ($U_x$) corresponds to the value predetermined by the computer (16). At the same time the rectifier (5) is controlled by the current regulator (14) in such a way that the actual current value ($i_x$) remains constant.

Because the difference in loudness during operation can be very great inside the slag (9) and outside of it, it is possible to very clearly define the operational state of the arc furnace (8) by means of the noise sensor or loudness detector (25). In the foaming slag (9), the arc (10) is much quieter than a free-burning arc. Accordingly, large differences occur with current and voltage fluctuations. Increasing noise can be used to stop the increase of the electrode regulator set value signal ($U_w$), see the operational block (37) in FIG. 2. A large noise causes the decrease of the electrode regulator set value signal ($U_w$), see the operational block (40) in FIG. 2.

The electrode regulator set value signal ($U_w$) provided to the electrode regulator (18) is monitored for the two limit values of DC voltage minimum value ($U_{min}$) and DC voltage reference value ($U_r$), corresponding to a minimally or maximally permissible electrode distance (d).

As long as the predetermined operational point is not inside of the slag (9), a report, see operational block (31) in FIG. 2, is issued as a request for slag increase. The arc furnace (8) is operated in the near range of the operational point (A), see FIG. 4, by the electrode regulator. It can be seen that in the lower range up to the operational point (A) the current and voltage fluctuations are less. It is possible to analyze the actual current value ($i_x$) the arc voltage ($U_x$) or an impedance calculated as the quotient of $U_x/i_x$ in regard to fluctuations. The result of this fluctuation analysis can be compared with a predetermined fluctuation limit value, wherein excess limit values are evaluated as indications for "arc (10) too long", analogously to the loudness evaluation.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A method of electrode regulation of a DC arc furnace, comprising the steps of:
    a. controlling arc current strength of the arc furnace to a predeterminable current set value in response to a variable control signal;
    b. controlling an electrode distance between at least one controllable electrode and a molten bath of the arc furnace as a function of a difference between a predeterminable electrode regulator set value signal and an electrode regulator actual signal; and
    c. forming the electrode regulator set value signal as a function of a slag height in the arc furnace.

2. A method in accordance with claim 1, further comprising a step of:
    a. varying the electrode regulator set value signal as a function of a signal proportional to a loudness signal detected during a melting operation, which exceeds a predeterminable limit value during a melting operation.

3. A method in accordance with claim 2, further including a step of determining an electrical arc field strength of an arc of the arc furnace and increasing the electrode regulator set value signal when:
    a. said electrical arc field strength is greater than a predeterminable first field strength limit value; and
    b. simultaneously the electrode regulator set value signal is less than a predeterminable DC voltage reference value of the arc furnace.

4. A method in accordance with claim 3, further comprising a step of decreasing the electrode regulator set value signal when:
    a. said electrical arc field strength is less than a predeterminable second field strength limit value; and
    b. simultaneously the electrode regulator set value signal is greater than a predeterminable DC voltage minimum value of the arc furnace.

5. A method in accordance with claim 4, further comprising a step of:
    a. calculating the electrical arc field strength as a function of an electrode regulator correcting variable of an electrode regulator.

6. A method in accordance with claim 5, further comprising the step of:
    a. calculating the electrical arc field strength in accordance with $E=\Delta U/\Delta s$, wherein E is the electrical arc field strength;
    b. forming $\Delta s$ by integration of a lift-lower speed of a controllable electrode during a predeterminable integration period; and
    c. evaluating the lift-lower speed as a function of the sign of the electrode regulator correcting variable, wherein $\Delta U$ is a voltage change of an electrode DC voltage during the integration period, and $\Delta s$ is a change in electrode distance of the controlling electrode from a molten bath during the integration period.

7. An electrode regulation device for a DC arc furnace comprising:
    a. at least one adjustable electrode which is in operative connection with a rectifier;
    b. a current regulator for controlling current of the at least one adjustable electrode;

c. an electrode adjustment device for setting an electrode distance between the at least one electrode and a molten bath of the arc furnace;

d. an electrode regulator for controlling the electrode adjustment device; and e. a loudness detector for detecting the loudness of the arc furnace, in operative connection with the electrode regulator via an evaluation device, such that an electrode regulator set value signal is varied as a function of a loudness signal from the loudness detector which exceeds a predeterminable loudness limit value.

8. A method in accordance with claim 1, further including a step of determining an electrical arc field strength of an arc of the arc furnace and increasing the electrode regulator set value signal when:

a. said electrical arc field strength is greater than a predeterminable first field strength limit value; and b. simultaneously the electrode regulator set value signal is less than a predeterminable DC voltage reference value of the arc furnace.

9. A method in accordance with claim 1, further comprising a step of determining an electrical arc field strength of an arc of the arc furnace and decreasing the electrode regulator set value signal when:

a. said electrical arc field strength is less than a predeterminable second field strength limit value; and b. simultaneously the electrode regulator set value signal is greater than a predeterminable DC voltage minimum value of the arc furnace.

10. A method in accordance with claim 8, further comprising a step of:

a. calculating the electrical arc field strength as a function of an electrode regulator correcting variable of an electrode regulator.

11. A method in accordance with claim 10, further comprising the step of:

a. calculating the electrical arc field strength in accordance with $E=\Delta U/\Delta s$, wherein E is the electrical arc field strength;

b. forming $\Delta s$ by integration of a lift-lower speed of a controllable electrode during a predeterminable integration period; and c. evaluating the lift-lower speed as a fuction of the sign of the electrode regulator correcting variable, wherein $\Delta U$ is a voltage change of an electrode Dc voltage during the integration period, and $\Delta s$ is a change in electrode distance of the controlling electrode from a molten bath during the integration period.

12. A method in accordance with claim 9, further comprising a step of:

a. calculating the electrical arc field strength as a function of an electrode regulator correcting variable of an electrode regulator.

13. A method in accordance with claim 12, further comprising a step of:

a. calculating the electrical arc field strength in accordance with $E=\Delta U/\Delta s$, wherein E is the electrical arc field strength;

b. forming $\Delta s$ by integration of a lift-lower speed of a controllable electode during a predeterminable integration period; and c. evaluating the lift-lower speed as a function of the sign of the electrode regulator correcting variable, wherein $\Delta U$ is a voltage change of an electrode DC voltage during the integration period, and $\Delta s$ is a change in electrode distance of the controlling electrode from a molten bath during the integration period.

* * * * *